United States Patent [19]
Isobe et al.

[11] Patent Number: 5,871,283
[45] Date of Patent: Feb. 16, 1999

[54] INTERMEDIATE COVER FOR USE IN A LINEAR GUIDE DEVICE

[75] Inventors: Rinzo Isobe; Toru Tsukada; Yoshinori Mizumura, all of Gunma, Japan

[73] Assignee: NSK Ltd., Tokyo, Japan

[21] Appl. No.: 811,173

[22] Filed: Mar. 4, 1997

Related U.S. Application Data

[62] Division of Ser. No. 427,832, Apr. 26, 1995, abandoned.

[30] Foreign Application Priority Data

Apr. 27, 1994 [JP] Japan .................................... 6-090218

[51] Int. Cl.⁶ .................................................. F16L 29/08
[52] U.S. Cl. ............................................................. 384/15
[58] Field of Search ................................ 384/15, 16, 35, 384/43, 44, 45

[56] References Cited

U.S. PATENT DOCUMENTS

| | | | |
|---|---|---|---|
| 3,446,539 | 5/1969 | Sartorio | 384/15 |
| 5,156,195 | 10/1992 | Wehler et al. | 384/15 |
| 5,169,223 | 12/1992 | Suzuki et al. | 384/15 |

*Primary Examiner*—Lenard A. Footland
*Attorney, Agent, or Firm*—Sughrue, Mion, Zinn, Macpeak & Seas, PLLC

[57] ABSTRACT

An intermediate cover is used to cover the surface of a guide rail existing between first and second sliders arranged on the guide rail of a linear guide device. The intermediate cover is structured such that it includes on the two ends thereof two mounting portions respectively for mounting the two ends of the cover onto the two sliders, and it also includes a body portion having a U-shaped section and including an upper surface and two side surfaces located adjacent to the upper surface and two side surfaces of the guide rail.

16 Claims, 13 Drawing Sheets

INTERMEDIATE COVER FOR USE IN A LINEAR GUIDE DEVICE

This is a divisional of application Ser. No. 08/427,832 filed Apr. 26, 1995, abandoned.

BACKGROUND OF THE INVENTION

The present invention relates to a dustproof cover for covering a guide rail of a linear guide device and, in particular, to an intermediate cover for covering the portion of a guide rail existing between two sliders when a plurality of sliders are provided on the guide rail.

Figure 14:
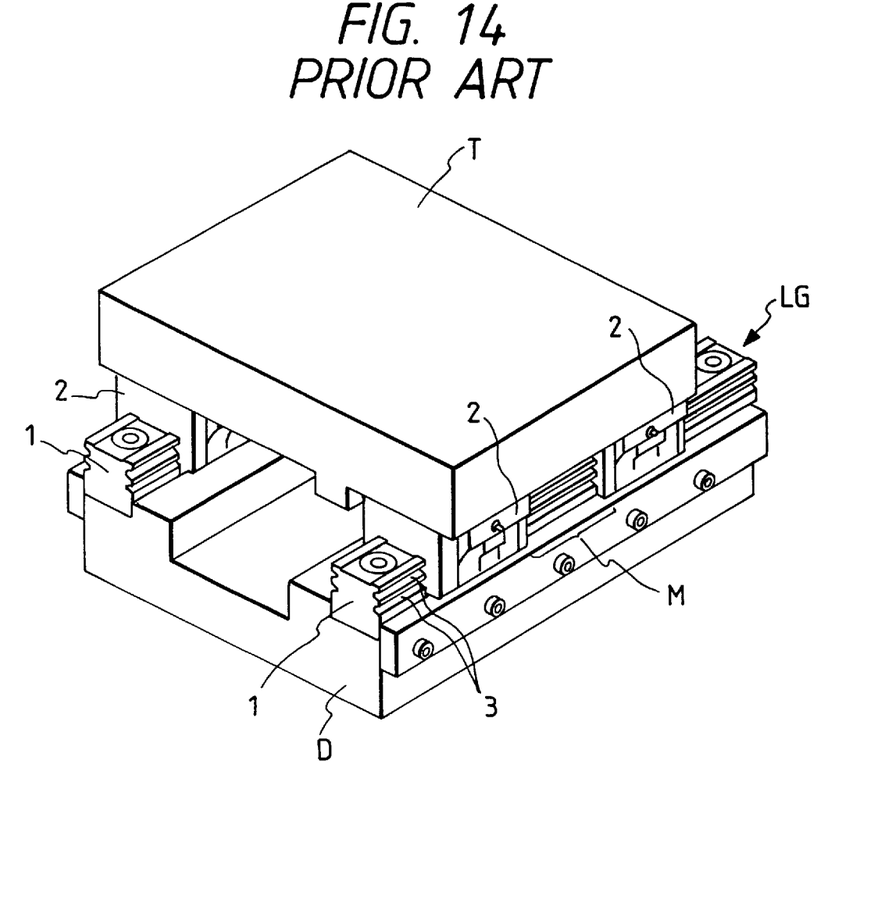
FIG. 14 is a perspective view of the linear guide device, explaining the using condition thereof.

When a linear guide device is assembled into a machine table, in most cases, normally, as shown in FIG. 14, four sliders 2 are mounted on the lower surface of a machine table T. That is, two sliders 2 are assembled onto a guide rail 1 to form one assembly and two other sliders 2 are assembled onto another guide rail 1 to form another assembly, while the two assemblies are fixed onto a machine base D in parallel to each other.

Foreign substances such as welding powder, chips, cutting oil, dust and the like are readily adhere to the linear guide device LG structured in this manner for supporting the machine table T. If such foreign substances are stuck to the guide rail especially to the upper and side surfaces of the guide rail 1, then they penetrate into the interiors of the moving sliders 2. In the interiors of the sliders 2, a large number of rolling members move endlessly while they roll within precisely machined loaded roller rolling passages each consisting of roller rolling grooves 3 formed on the side surfaces of the guide rail 1 and roller rolling grooves (not shown) formed on the inner surfaces of the sliders opposed to the guide rail 1 side surfaces, thereby allowing the sliders 2 to move smoothly. The penetration of the foreign matter into the interiors of the sliders 2 can interfere the smooth rolling movements of the rolling members and thus can worsen the movement precision and the like of not only the sliders 2 but also the machine table T. Therefore, taking proper dustproofing measures in the guide rails is one of the important technical items.

Figure 15:
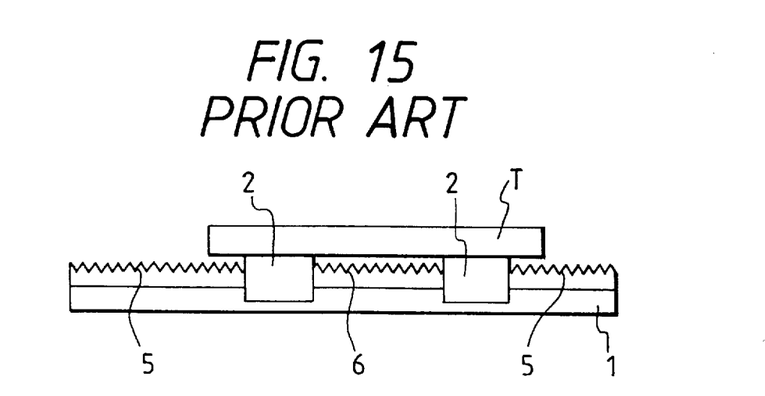
FIG. 15 is a side view of a linear guide device on which a conventional intermediate cover of a bellows type is mounted.
Figure 16:
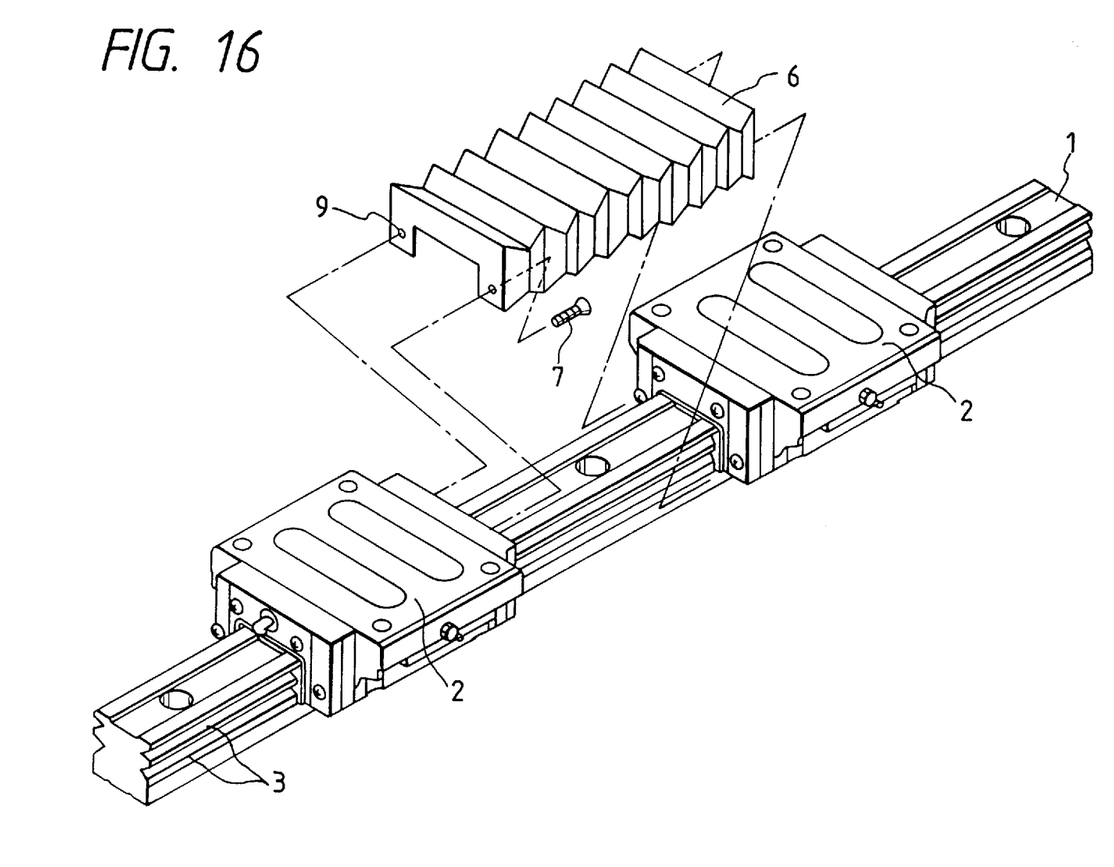
FIG. 16 is a perspective view of a linear guide device and a conventional intermediate cover of a bellows type, explaining how to mount the cover onto the linear guide device.

In a conventional guide rail, as means for preventing the guide rail against dust, as shown in FIG. 15, in most cases, bellows 5 and 6 are used. To provide such bellows, Neoprene rubber is coated on the two side surfaces of nylon fiber cloth and further a reinforcing polyester film is adhered to the above to thereby form a sheet. The sheet is folded in a wave form in such a manner that it is freely expandable and contractible, and then two steel plates are respectively mounted to the two ends of the sheet. The bellows 5 respectively provided in the rail end portions are mounted in such a manner that one end of each of the bellows 5 is tapped and fixed to the one end face portion of the guide rail 1 by a screw, while the other end thereof is screwed to the outer end face of the slider 2. On the other hand, the bellows 6, which serves as an intermediate cover for covering the intermediate portion of the guide rail 1 existing between the two sliders 2 and 2, as shown in FIG. 16, is mounted in such a manner that one end thereof is screwed to the inner end face of one slider 2 by a mounting screw 7 while the other end thereof is similarly screwed to the inner end face of the other slider 2 (FIG. 17).

Figure 17:
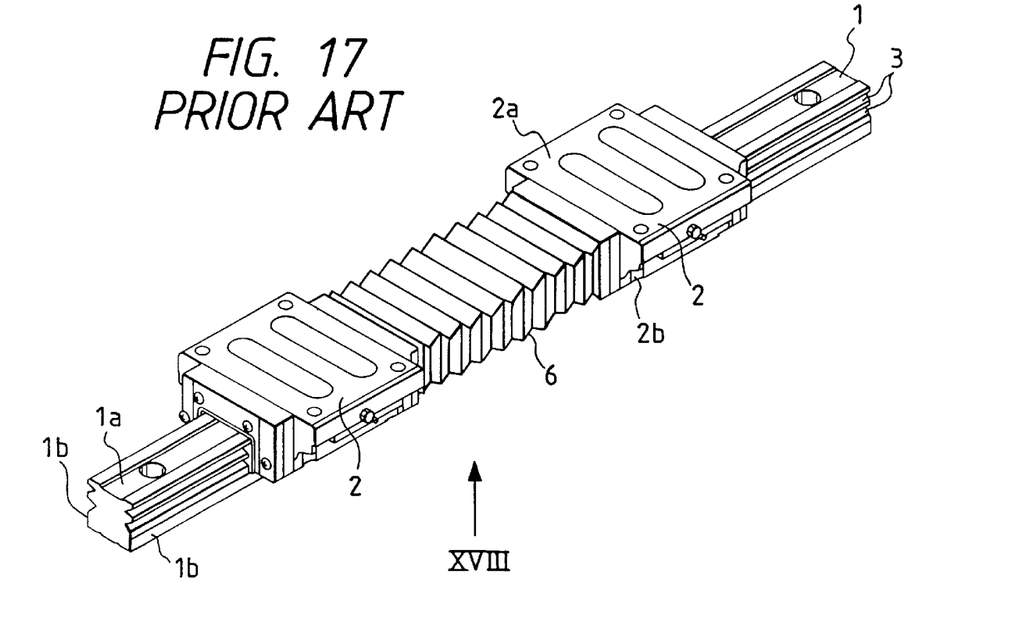
FIG. 17 is a perspective view of a linear guide device on which the conventional intermediate cover of a bellows type is mounted; and, FIG. 18 is a bottom view of the intermediate cover of a bellows type shown in FIG. 17, when viewed from the direction of an arrow XVIII shown in FIG. 17.
Figure 18:
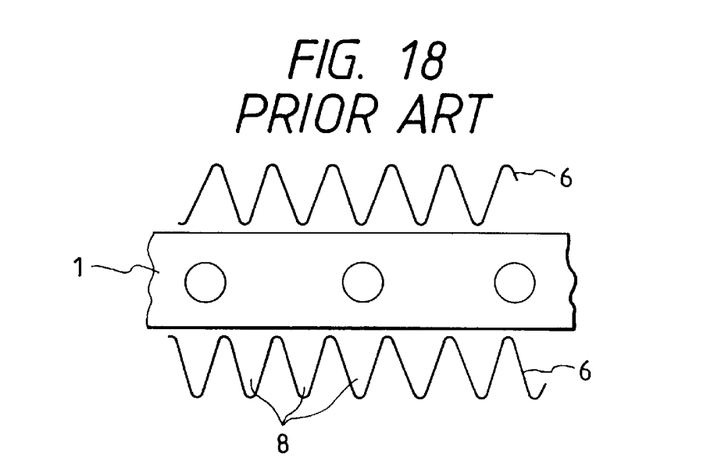

However, in the above-mentioned conventional bellows 6 serving as an intermediate cover, as shown in FIG. 18 in which the bellows portion of FIG. 17 is viewed from below, the lower portions of the bellows are open so that large gaps 8 are formed in continuous waves between the guide rail 1 and the bellows lower portions. That is, foreign substances are can invade the guide rail 1 through these gaps 8.

Also, since the bellows are formed in waves the crown and valley portions thereof to continue with each, the bellows 6 occupies most of a U-shaped space existing between the upper surface 1a and two side surfaces 1b of the guide rail 1 and the upper surface 2a and two side surfaces 2b of the slider 2. This interferes with a space which is necessary to arrange an oil feed pipe for supply of lubricating oil to the linear guide device LG and other attached devices.

Further, when the linear guide device LG is used in such a manner that it is mounted horizontally or vertically on a wall, or when it is used in such a manner that it is mounted to a ceiling upside down, the bellows 6 hangs down so that it cannot protect the guide rail from dust completely, or the bellows 6 can come into contact with other portions of the linear guide device LG.

Moreover, in the conventional bellows, when the end portions thereof are screwed to the slider, as shown in FIG. 16, it is necessary that the mounting screw 7 be inserted into a screw hole 9 formed in the cover end portion from inside of the bellows 6, and it is then threadably engaged into a screw hole formed in the end face of the slider 2, before it is tightened. Thus, the conventional bellows is difficult to mount.

In addition, the bellows is expensive and the durability thereof is not satisfactory.

SUMMARY OF THE INVENTION

In view of the above-mentioned conventional circumstances, the present invention has been made to eliminate the above problems. Accordingly, it is an object of the invention to provide an intermediate cover for use in a linear guide device, which is an improvement of the conventional intermediate cover, prevents production of gaps through which foreign substances can invade a guide rail from the lower portion of the intermediate cover, can reduce its occupation space when it is mounted, is easy to mount, can be used even in mounting conditions other than in the horizontal mounting condition thereof, is inexpensive, and is excellent in durability.

In attaining the above object, according to the invention, there is provided an intermediate cover for covering the exposed surface of a guide rail existing between first and second sliders respectively fitted with the guide rail in such a manner that the first and second sliders can be moved with respect to the guide rail by means of the rolling movements of a large number of rolling members within loaded roller rolling grooves respectively formed in the guide rail and extending in the axial direction of the guide rail, in which the intermediate cover includes on the two ends thereof two mounting portions respectively for mounting the two ends of the cover to the first and second sliders and further includes a body portion of a U-shaped section including an upper surface and two side surfaces located adjacent to the above-mentioned surface of the guide rail.

Here, the mounting portions for mounting the cover to the sliders may be formed in a screwable structure, or in a hook shape to provide a structure in which the hook is inserted between a side seal on the end face of the slider and an end cap.

Also, the body portion of the intermediate cover may be formed in an integral structure, or may be formed in a combined structure consisting of a plurality of members which partially overlap one another in the axial direction of the intermediate cover.

Further, the lower end portion of the body portion of the intermediate cover may be tightened inwardly to thereby minimize a gap between the side surface of the guide rail and the lower end portion.

Moreover, the lower end portion of the body portion of the intermediate cover may be folded inwardly, there may be formed an axially extending recessed groove in the side surface of the guide rail, and the folded lower end portion is inserted into the recessed groove to thereby assemble the intermediate cover and guide rail together.

In addition, a sealing member is mounted to the lower end portion of the body portion of the intermediate cover to thereby seal a gap between the intermediate cover and guide rail.

Since the intermediate cover according to the invention includes a body portion which has a U-shaped section and an upper surface and two side surfaces respectively located adjacent to the upper surface and side surfaces of the guide rail, unlike the conventional bellows, the possibility that a large gap can be produced between the guide rail and intermediate cover is eliminated. Also, the intermediate cover does not occupy a large part of spaces respectively existing between the upper surface and two side surfaces of the guide rail and the upper surface and two side surfaces of the slider as in the conventional bellows, thereby allowing more space for an oil feed pipe and the like.

Also, even if a linear guide device is mounted upside down, there is no possibility that the intermediate cover can be deformed or can hang down.

Further, if the mounting portions of the intermediate cover for mounting the cover to the slider are structured such that they can be fixed by screws, then the possibility that the mounting screws and the body portion of the intermediate cover can interfere with each other as in the conventional bellows is eliminated.

Moreover, if the mounting portions of the intermediate cover for mounting the cover to the slide are structured in a hook shape, then the intermediate cover can be mounted simply by loosening the mounting bolt of the side seal on the end face of the slider and then inserting the hook-shaped mounting portions between the end cap and the side seal. This makes it possible to mount and remove the intermediate cover easily.

If the body portion of the intermediate cover is formed in a combined structure consisting of a plurality of members overlapped in part on one another, then the overlapping margins are adjusted to thereby allow the whole length of the intermediate cover to correspond to a variation in the distance between the two sliders.

If the lower end portion of the body portion of the intermediate cover is folded inwardly and is then inserted into and assembled with the recessed groove formed in the side surface of the guide rail, then this structure functions as a labyrinth seal and can perform a high quality dustproofing function. And, if the seal member is mounted to the lower end portion of the body portion of the intermediate cover to thereby seal a gap between the guide rail and the intermediate cover, then the structure can perform a higher quality dustproofing operation.

DETAILED DESCRIPTION OF THE INVENTION

Now, the preferred embodiments of the present invention will be described with reference to the accompanying drawings. In the following, the same parts or equivalent parts to the above-mentioned conventional devise are given the same designations.

Figure 1:
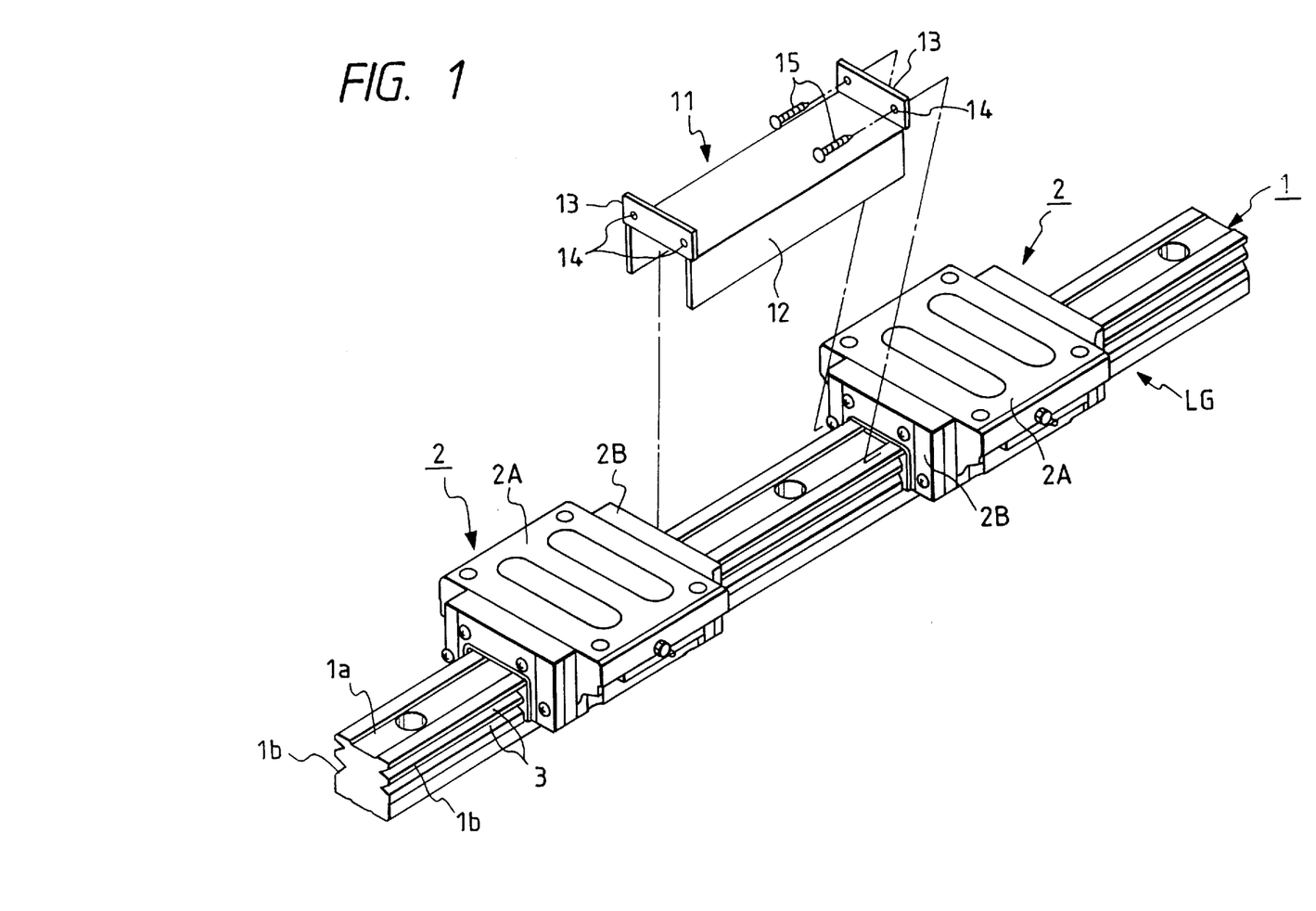
FIG. 1 is a perspective view of a first embodiment of an intermediate cover according to the invention and a linear guide device on which the present intermediate cover is mounted.
Figures 2, 3:
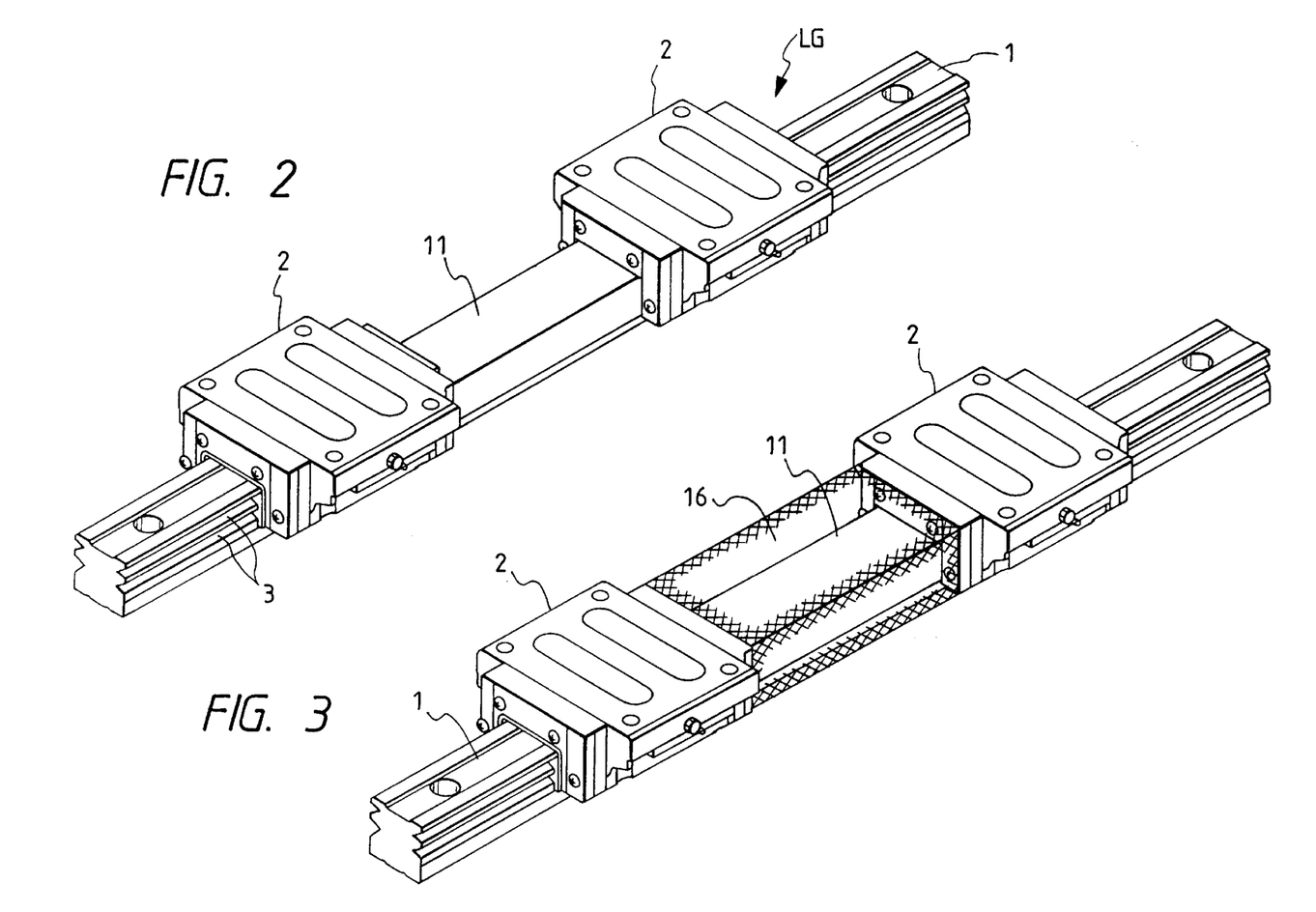
FIG. 2 is a perspective view of a linear guide device on which the intermediate cover of FIG. 1 is mounted.
FIG. 3 is a perspective view of an effectively usable vacant space existing in the periphery of the intermediate cover mounted on the linear guide device.

FIGS. 1 to 3, illustrate a first embodiment of an intermediate cover according to the invention. In particular, FIG. 1 is a perspective view of an intermediate cover 11 and a linear guide device LG to which the intermediate cover 11 is mounted, FIG. 2 is a perspective view of the linear guide device LG, showing a state thereof in which the intermediate cover 11 is already mounted, and FIG. 3 is a perspective view of the linear guide device LG, showing a vacant space existing in the periphery of the intermediate cover 11 mounted to the linear guide device LG.

The intermediate cover 11 according to the first embodiment shown in FIG. 1 includes a body portion 12 which has a U-shaped section and is located adjacent to the upper surface 1a and two side surfaces 1b of a guide rail 1, and also includes on the two ends thereof mounting portions 13 which are respectively used to mount the intermediate cover 11 onto first and second sliders 2, 2. In this embodiment, the body portion 12 and mounting portions 13 are formed integrally with each other by press forming a steel plate. The mounting portions 13 are formed by folding the two projected end portions of the upper surface of the body portion 12 upwardly at right angles, and each of the mounting portions includes two bolt insertion holes 14. However, the material of the intermediate cover 11 is not limited to the steel plate. For example, nonferrous metals such as aluminum and the like, or synthetic resin such as vinyl chloride and the like can be used. The important thing is to use a hard material which can never hang down due to its own weight, not such a soft material as in the bellows.

To mount the intermediate cover 11 to the linear guide device LG, the intermediate cover 11 is put on the portion of the guide rail 1 existing between the first and second sliders 2, 2, mounting screws 15 (that is, mounting screws which are used to fix the end caps 2B to the end portions of the slider main bodies 2A of the sliders 2) are inserted through the bolt insertion holes 14 of the mounting portions 13 in such a manner as shown in FIG. 1, and the mounting screws 15 are engaged into screw holes (not shown) formed in the slider main bodies 2A and are then tightened. During this operation, since there is no possibility that the mounting screws 15 and body portion 12 can interfere with each other, even an unskilled person can easily tighten and fix the mounting screws 15.

When the intermediate cover 11 is mounted in such a manner as shown in FIG. 2, then, in the periphery of the intermediate cover 11, there exists such a U-shaped space 16 as shown by meshes in FIG. 3, which serves as a vacant space for connecting the upper surface and two side surfaces of each of the first and second sliders 2, 2. This space 16 can be effectively used as a space for arranging an oil feed pipe for the linear guide device or for arranging other devices.

Also, the intermediate cover 11 is structured such that the body portion 12 thereof has a U-shaped section and is located quite adjacent to the upper surface 1a and side surfaces 1b of the guide rail 1, which prevents a large gap from being produced between the guide rail 1 and the intermediate cover 11. Therefore, the possibility of invasion of foreign matter from the lower end of the body portion 12 of the intermediate cover 11 is far lower when compared with the conventional bellows.

In the case of the linear guide device LG with the intermediate cover 11 mounted thereto as shown in FIG. 2, even if the linear guide device LG is horizontally or vertically mounted on a wall, or it is mounted on a ceiling upside down, there is no possibility that the intermediate cover 11 can hang down, and thus the linear guide device LG can be stabilized regardless of its mounting attitudes.

Now, in FIGS. 4(a) to 8(d), there are shown other embodiments of an intermediate cover according to the invention, which are respectively formed so as to enhance the dustproofing action of the intermediate cover 11 according to the above-mentioned first embodiment.

Figure 4A:
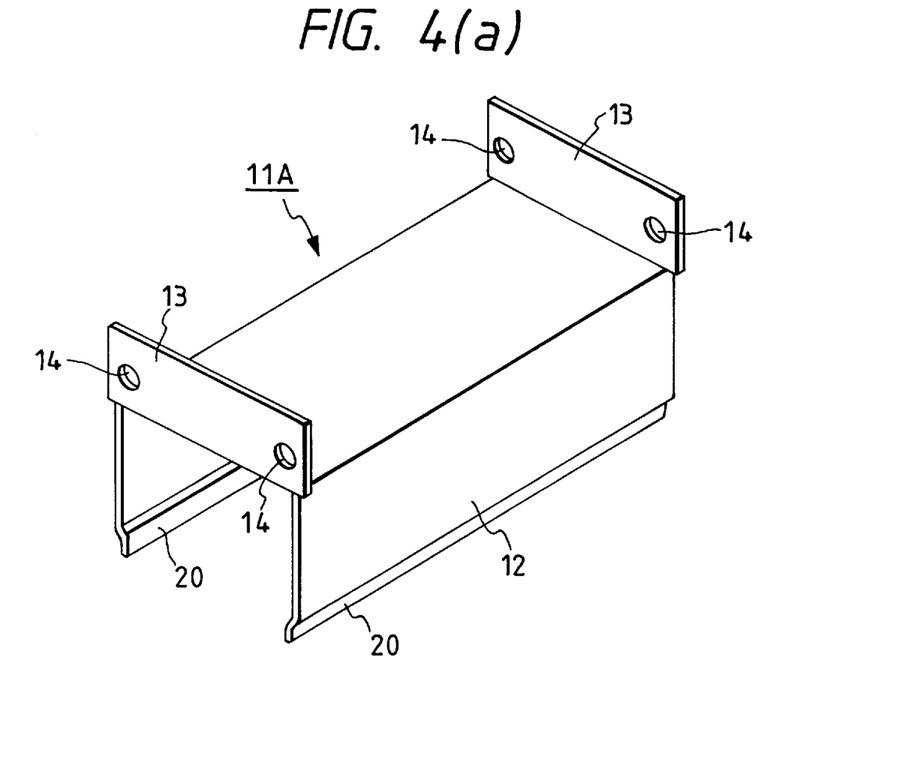
FIG. 4(a) is a perspective view of a second embodiment of an intermediate cover according to the invention.
Figure 4B:
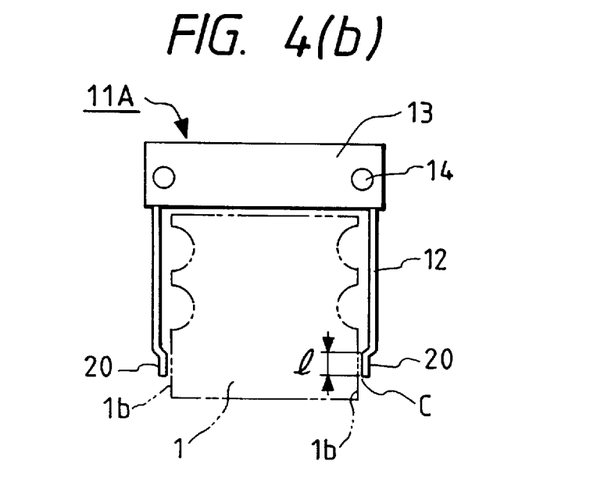
FIG. 4(b) is an end face view of the second embodiment.

In an intermediate cover 11A according to a second embodiment shown in FIGS. 4(a) and 4(b), the side surface lower end portions of the body portion 12 thereof are narrowed inwardly over the whole longitudinal length thereof to a hairsbreadth of the side surfaces of the guide rail 1 to form narrowed portions 20, thereby minimizing the size of the opening of a space C between the side surface 1b of the guide rail 1 and the side surface lower end portion of the intermediate cover 11A in order to prevent the invasion of the foreign substances. The longer the length of the narrowed portion 20 in the vertical direction in FIG. 4 is, the higher the dustproofing effect is, and the more easily and inexpensively the intermediate cover 11A can be manufactured.

Figure 5A:
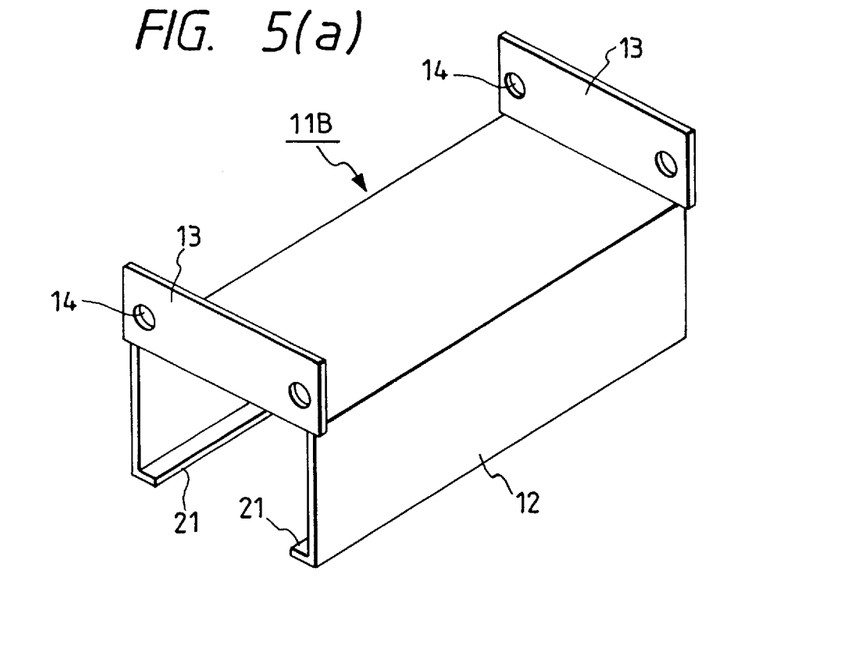
FIG. 5(a) is a perspective view of a third embodiment of an intermediate cover according to the invention.
Figure 5B:
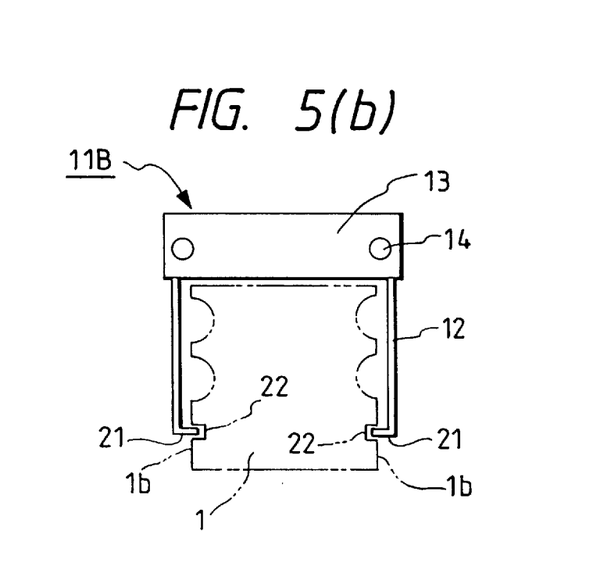
FIG. 5(b) is an end face view of the third embodiment.

In FIG. 5, there is shown a third embodiment of an intermediate cover according to the invention.

In the intermediate cover 11B according to the third embodiment, the side surface lower end portions of the body portion 12 thereof are folded inwardly over the whole length thereof to thereby form labyrinth seal portions 21. On the other hand, on the two side surfaces 1b of the guide rail 1, there are formed recessed grooves 22 in such a manner that they respectively correspond to the labyrinth portions 21. To mount the intermediate cover 11B onto the guide rail 1, the labyrinth seal portions 21 thereof are engaged with their respective recessed grooves 22 of the guide rail 1 in a non-contact manner. In this case, due to the labyrinth action of bent gaps respectively produced between the labyrinth seal portions 21 and recessed grooves 22, there can be obtained a high dustproofing effect. In addition, the non-contact sealing prevents generation of a sliding resistance while the sliders 2 are travelling.

Figure 6A:
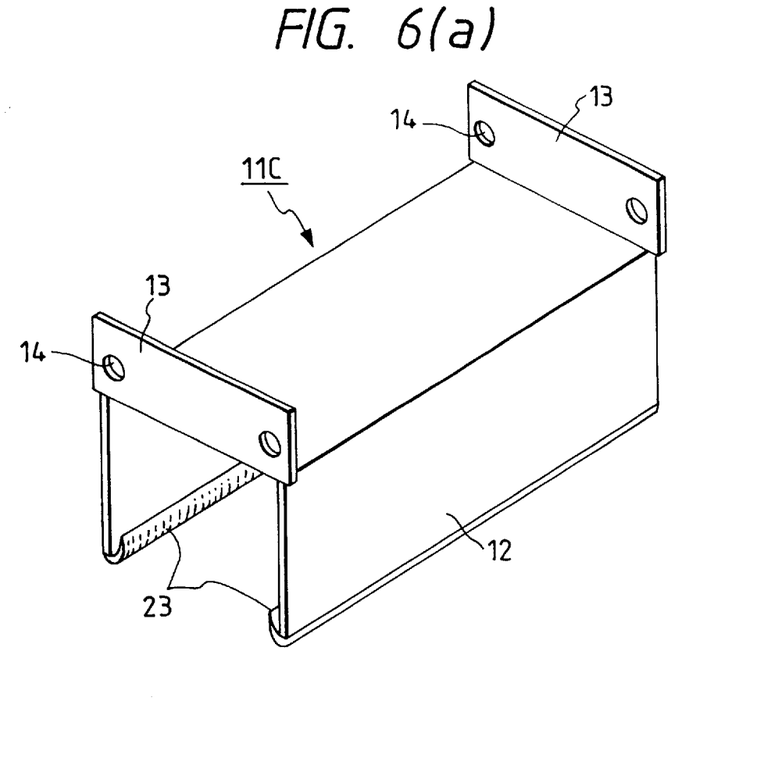
FIG. 6(a) is a perspective view of a fourth embodiment of an intermediate cover according to the invention.
Figure 6B:
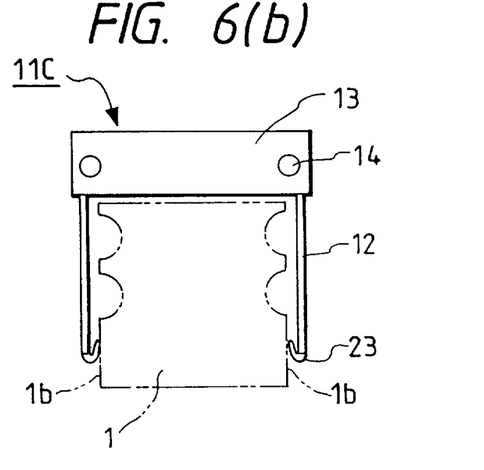
FIG. 6(b) is an end face view of the fourth embodiment.

Now, in FIG. 6, there is shown a fourth embodiment of an intermediate cover according to the invention.

In the intermediate cover 11C according to the fourth embodiment, sealing members 23, which are respectively formed of rubber or synthetic resin in a J or U shape, are fixed to the interiors of the side surface lower end portions of the body portion 12 thereof.

If the present intermediate cover 11C is mounted, then the lips of the sealing members 23 come into contact with the side surfaces 1b of the guide rail 1 to thereby be able to prevent the penetration of the foreign matters perfectly.

Figure 7A:
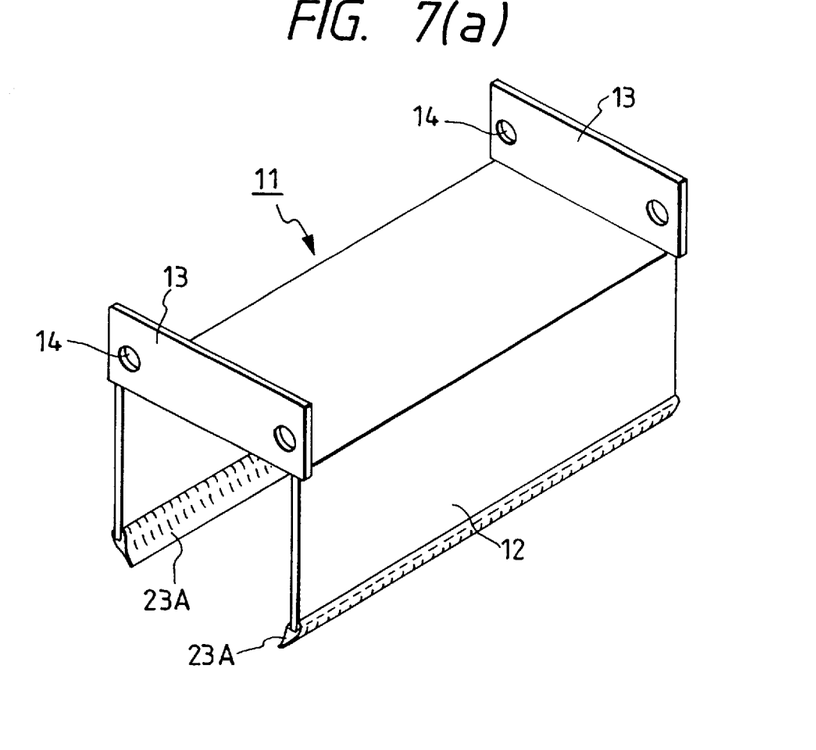
FIG. 7(a) is a perspective view of a modified version of an intermediate cover shown in FIGS. 6(a) and 6(b)
Figure 7B:
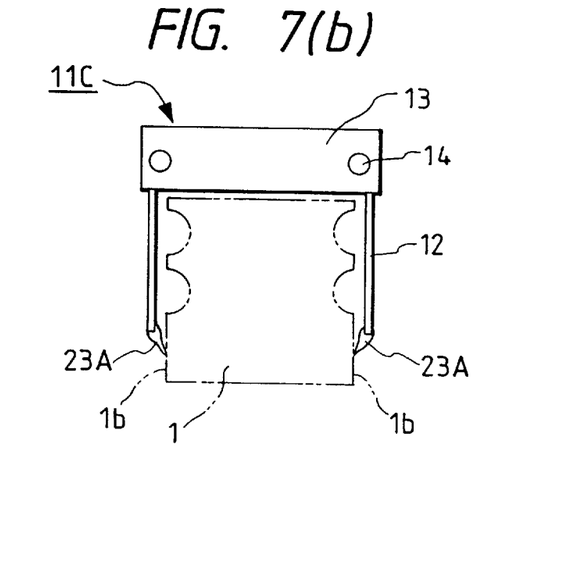
FIG. 7(b) is an end face view of the modified version of FIG. 7(a)

Now, in FIG. 7, there is shown a modified version of the intermediate cover 11C shown in FIG. 6, which is different from the intermediate cover 11C in that the sealing members 23A thereof are respectively formed in a plate shape.

Next, in FIGS. 8(a)–8(d), there is shown a fifth embodiment of an intermediate cover according to the invention.

Figure 8A:
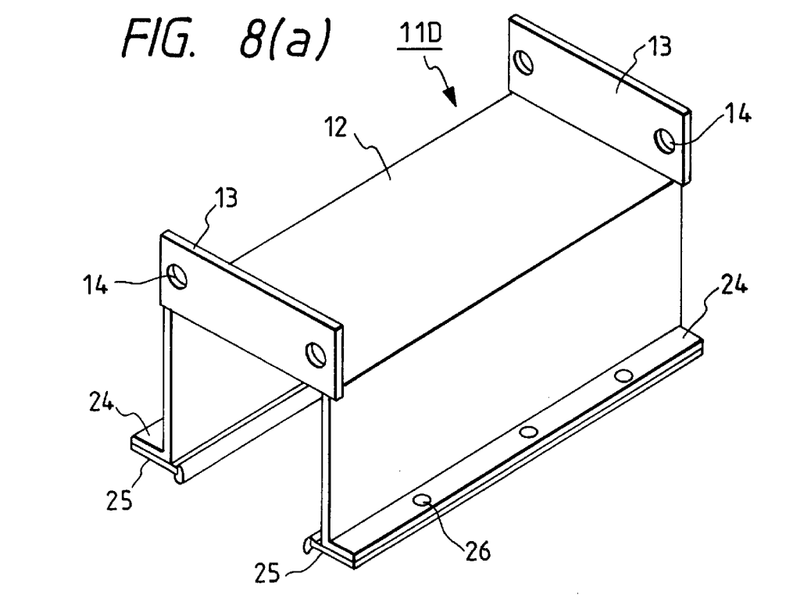
FIG. 8(a) is a perspective view of a fifth embodiment of an intermediate cover according to the invention.
Figure 8B:
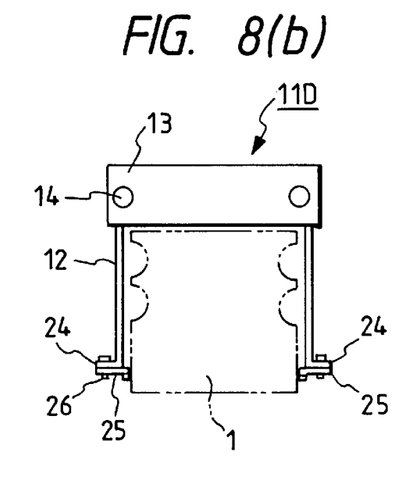
FIG. 8(b) is an end face view of the fifth embodiment.

In the intermediate cover 11D according to the fifth embodiment, the side surface lower end portions of the body portion 12 thereof are folded outwardly over the whole length thereof to form flanges 24, and under seals 25 are mounted onto the lower surfaces of the thus formed flanges 24 by use of rivets 26.

Figure 8C:
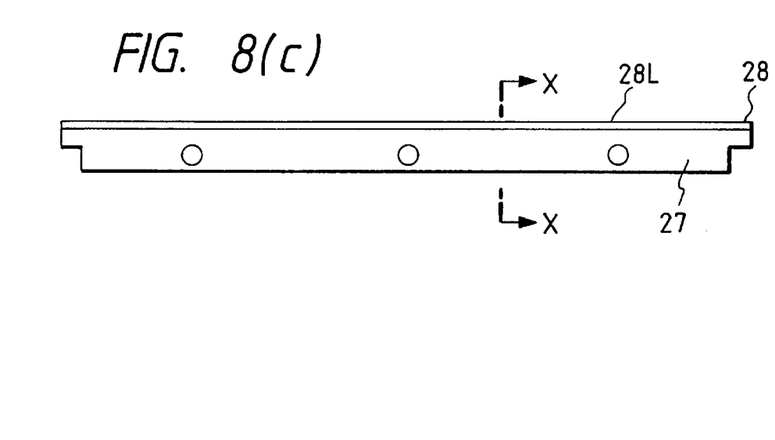
FIG. 8(c) is a plan view of an under seal employed in the fifth embodiment.
Figure 8D:
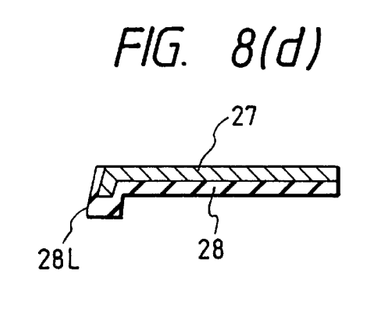
FIG. 8(d) is a section view of the under seal, taken along the arrow line X—X shown in FIG. 8 (c)

The under seal 25 can be formed by baking and sticking a rubber sealing member 28 to a rectangular core metal 27 formed of a steel plate. If the under seal 25 is mounted in such a manner that a seal lip 28L provided in the inner end edge of the sealing member 28 is in contact with the side surface 1b of the guide rail 1, then there can be provided a contact seal.

Figure 9A:
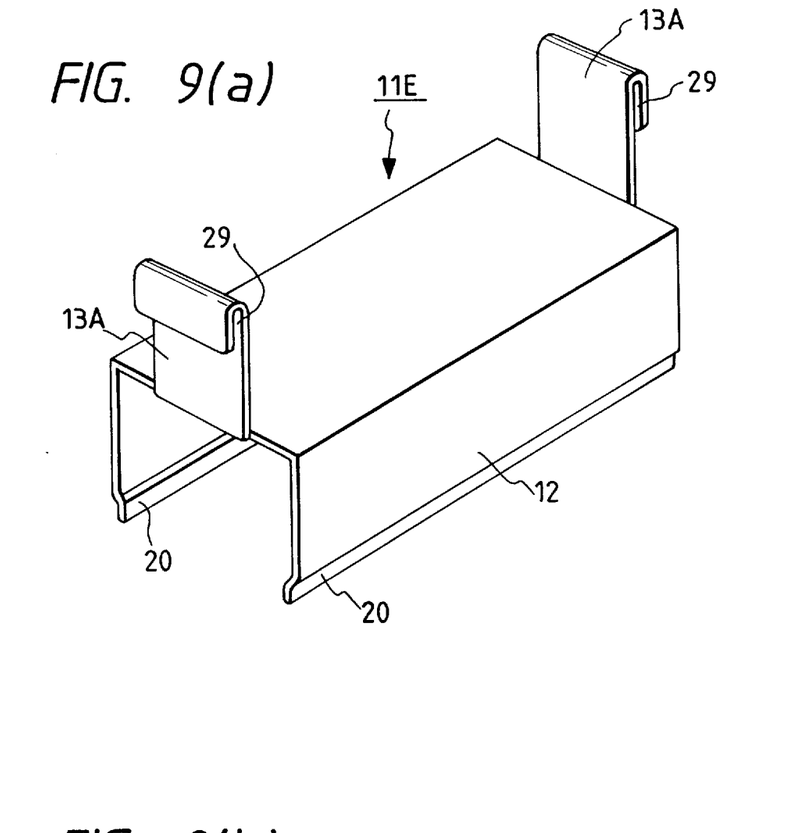
FIG. 9(a) is a perspective view of a sixth embodiment of an intermediate cover according to the invention.
Figure 9B:
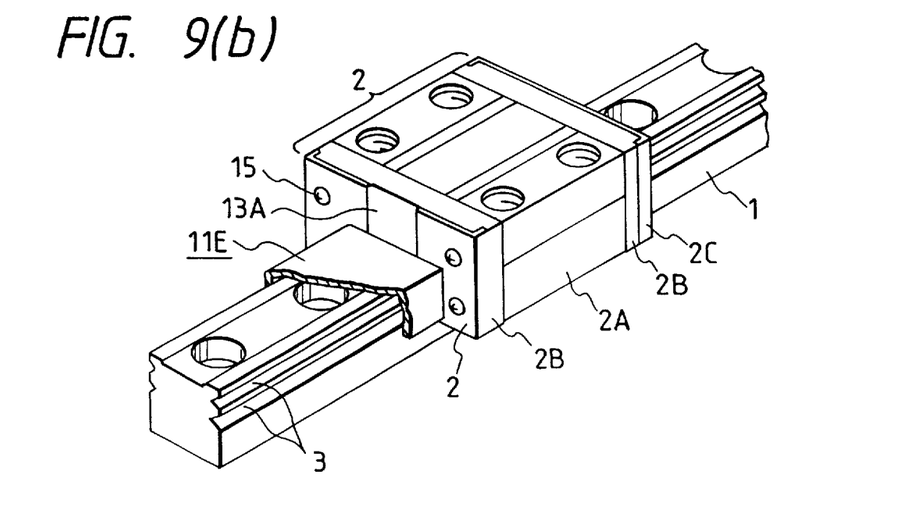
FIG. 9(b) is a perspective view of the intermediate cover when it is mounted on the linear guide device.

FIGS. 9(a) and 9(b) a sixth embodiment of an intermediate cover mounting structure according to the invention.

The present intermediate cover 11E is different from the intermediate cover 11A shown in FIG. 4 in that, instead of the mounting portions 13 respectively including the mounting bolt insertion holes 14, it includes in the body portion thereof mounting portions 13A respectively formed continuously with the body portion, while each mounting portion 13A includes a folded hook 29 which is formed by folding one end portion of the mounting portion 13A.

In mounting the present intermediate cover 11E, there are used end caps 2B and side seals 2C which are fixedly mounted on the end faces of the first and second sliders 2, 2 by use of bolts 15. That is, the end cap mounting bolts 15 are loosened to thereby produce gaps respectively between the end caps 2B and side seals 2C, the hooks 29 of the mounting portions 13A are respectively inserted into the gaps and caught by the side seals 2C, and then the bolts 15 are tightened to thereby fix them.

In the intermediate covers 11B–11D respectively shown in FIGS. 5(a)–8(d) as well, the mounting portions 13A each having the above-mentioned hook 29 can be used instead of the mounting portions 13.

FIGS. 10 to 13, illustrate other embodiments of an intermediate cover according to the invention, in which the box-like body portion of the intermediate cover is not formed in an integral one but is formed in a plurality of divided portions.

Figure 10:
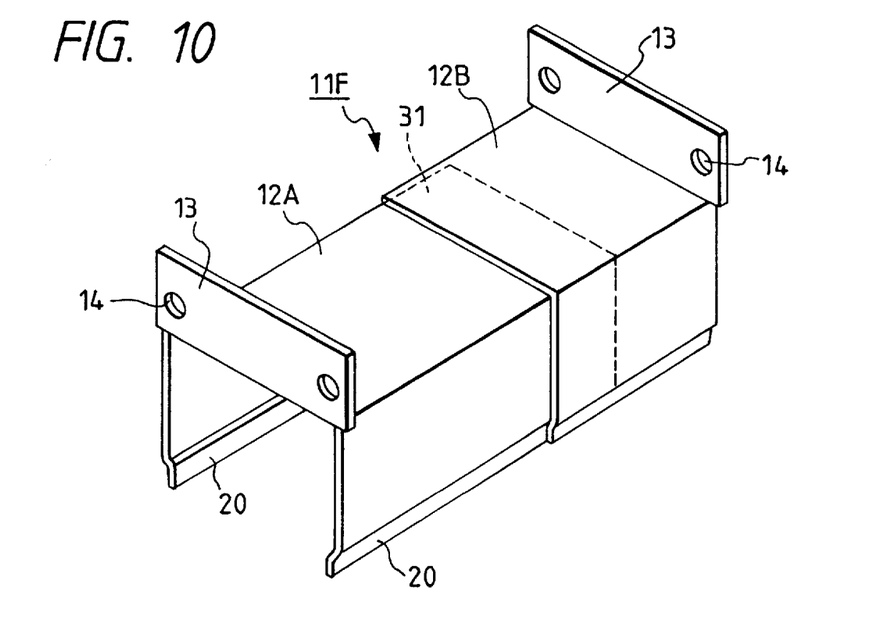
FIG. 10 is a perspective view of a seventh embodiment of an intermediate cover according to the invention.

FIG. 10 shows a seventh embodiment of the invention. In an intermediate cover 11F of a division type shown in FIG. 10, the body portion 12 shown in FIG. 4 is divided in the axial direction thereof into two body sub-portions 12A and 12B and two connecting portions 31 are overlapped on each other. According to the present embodiment, the whole length of the intermediate cover 11F can be adjusted within a range which allows the connecting portions 31 to remain as they are and, therefore, one kind of the intermediate cover 11F is advantageously able to deal with various slider distances in the linear guide device at low costs.

If the body sub-portions 12A and 12B are respectively coated with rubber or synthetic resin, then the connecting portions 31 can be overlapped on each other through the coated film, which not only prevents the invasion of the foreign substances effectively but also prevents the connecting portions 31 from being shaken to thereby be able to position the connecting portions 31 accurately. Also, the rust proofing property and sound proofing property are also improved.

Figure 11:
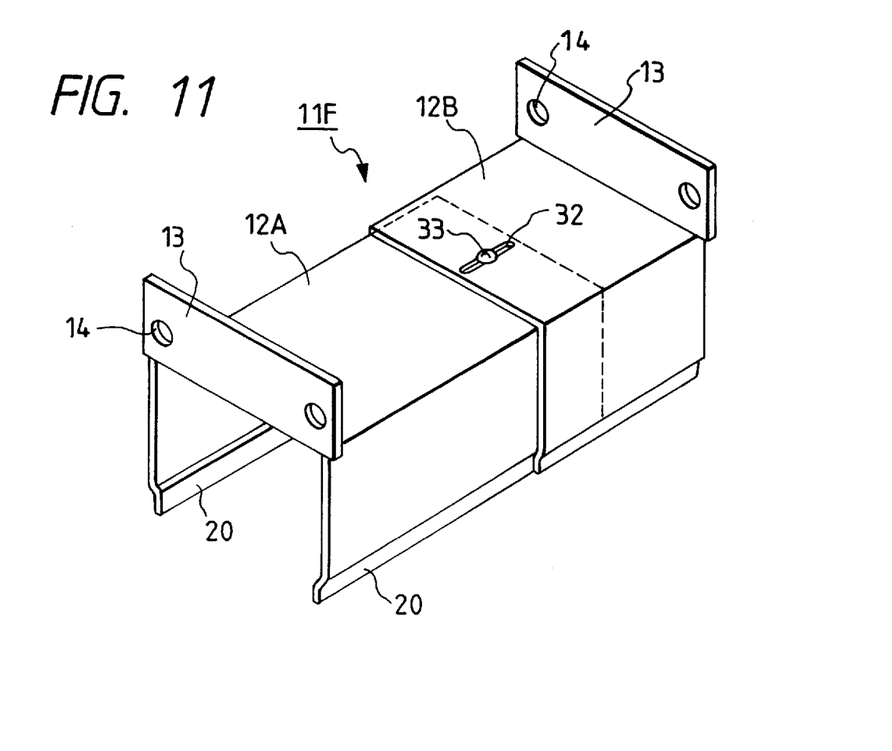
FIG. 11 is a perspective view of a modified version of the intermediate cover shown in FIG. 10.

In FIG. 11, there is shown a modified version of the intermediate cover 11F shown in FIG. 10, in which an axially extending elongated hole 32 is formed in the connecting portion 31 of the outer body sub-portion 12B and the two body sub-portions 12A and 12B are connected together by use of a screw 33 in such a manner that the length thereof can be adjusted, thereby increasing the strength of the connection thereof.

Figure 12:
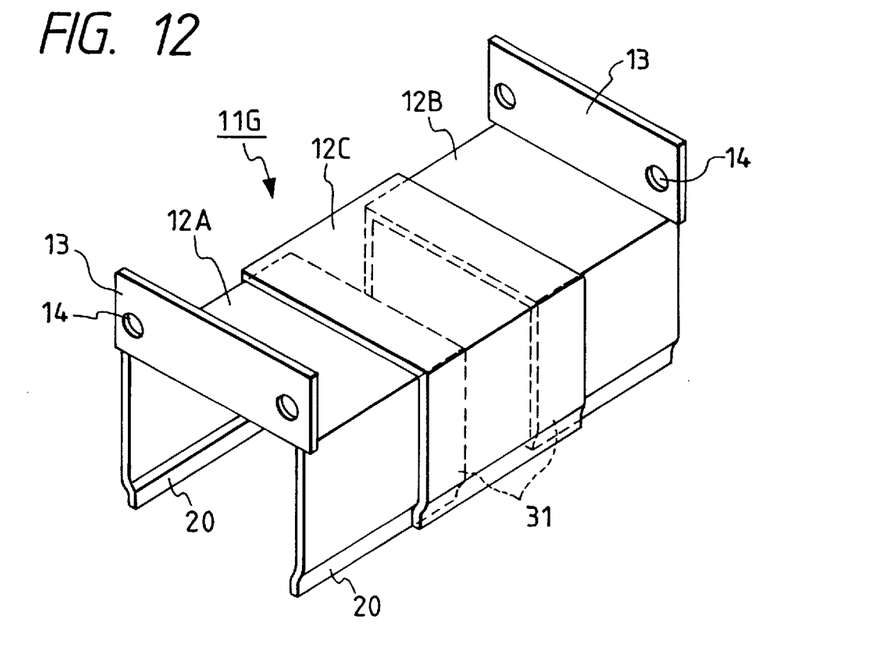
FIG. 12 is a perspective view of an eighth embodiment of an intermediate cover according to the invention.

FIG. 12, illustrates an eighth embodiment of an intermediate cover according to the invention.

The intermediate cover 11G according to the present embodiment is different from the above-mentioned intermediate cover 11F in that the body portion 12 shown in FIG. 4 is axially divided into three portions, that is, body portions 12A and 12B respectively located in the two end portions of the intermediate cover 11G, and a body portion 12C located in the central portion of the cover 11G.

If the intermediate cover 11G is formed in three portions the length of the cover can be advantageously adjusted according to the difference between the intermediate portions and the central body portion 12C can be removed easily to facilitate the inspection of the guide rail 1 within the cover as well as the check of lubricant for presence or absence.

Further, even when the distance between the first and second sliders 2 mounted in the linear guide device varies greatly, only the central body portion 12C of the intermediate cover may be re-arranged and the two end-side body portions 12A and 12B may be used as they are. That is, the intermediate cover of a three division type is very economical.

Figure 13:
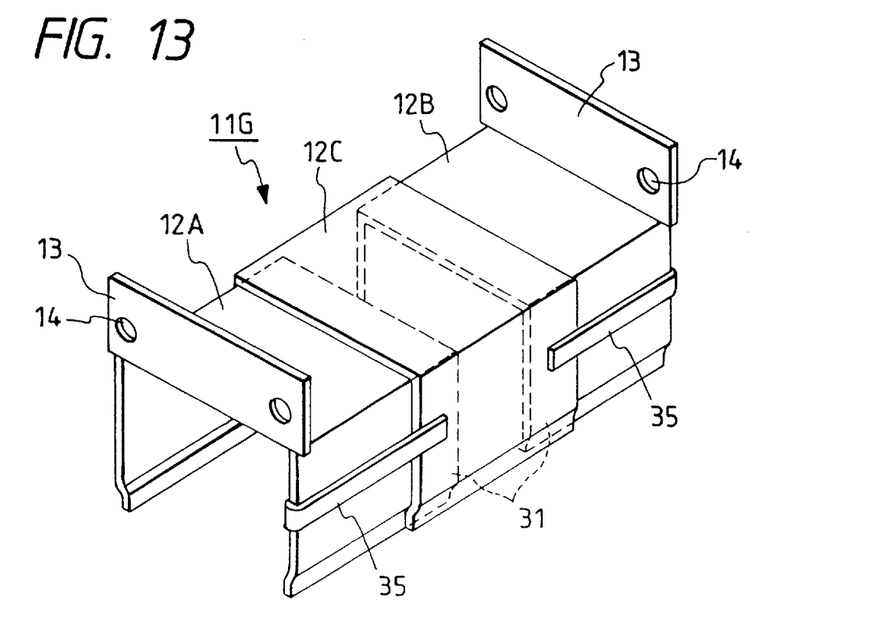
FIG. 13 is a perspective view of a modified version of the intermediate cover shown in FIG. 12.

FIG. 13, illustrates a modification of the intermediate cover shown in FIG. 12. In this modification, there are provided central body portion securing portions 35 which are formed by folding back the side surface end portions of the two end-side body portions 12A and 12B of the intermediate cover 11G respectively in a belt shape, whereby the central body portion 12C can be secured mechanically strongly.

As has been described heretofore, according to the invention, there is provided an intermediate cover for covering the surface of a guide rail exposed between first and second sliders fitted with a guide rail in such a manner that the first and second sliders are movable with respect to the guide rail through the rolling movements of a large number of rollers rollable within loaded roller rolling grooves respectively formed axially in the guide rail. Especially, the present intermediate cover includes in the two ends thereof two mounting portions respectively for mounting the two ends of the intermediate cover to the first and second sliders, and also includes a body portion of a U-shaped section including an upper surface and two side surfaces which are respectively located adjacent to the above-mentioned surface of the guide rail. This structure reduces the size of gaps respectively produced between the guide rail and intermediate cover to effectively prevent foreign substances from invading into the cover and also to secure space for provision of an oil feed pipe or the like in the periphery of the cover. Also, due to the present structure, the intermediate cover can be mounted to the sliders easily. Further, the present invention can provide an intermediate cover which can be used effectively regardless of the mounting conditions of the linear guide device, can be manufactured at low costs, and can enjoy a high durability.

Also, according to another aspect of the invention in which a seal structure is provided in the lower portion of the intermediate cover, the above-mentioned effects can be provided and an increased dustproofing effect can be obtained.

Further, according to still another aspect of the invention in which the body portion of the intermediate cover are formed in a division type consisting of a plurality of divisional portions, the whole length of the intermediate cover can be adjusted so that the cover is easily able to deal with a variation in the distances between the sliders.

What is claimed is:

1. An intermediate cover for covering an exposed surface of a guide rail of a linear guide device existing between a first slider and a second slider respectively fitted with said guide rail in such a manner that said first and second sliders are movable with respect to said guide rail through rolling movements of a large number of rolling elements within loaded roller rolling grooves respectively formed in said guide rail and extending in an axial direction of said guide rail, said intermediate cover comprising:

a body portion of a U-shaped section including an upper surface and two side surfaces respectively located adjacent to said exposed surface of said guide rail; and two mounting portions disposed at two ends of said body portion respectively for mounting said intermediate cover onto said first and second sliders, wherein said mounting portions are projected end portions of said upper surface of said body portion folded upwardly at right angles;

wherein said body portion and said mounting portions are made of a material which is rigid enough to support its own weight and is selected from a group consisting of steel, nonferrous metal, and synthetic resin.

2. The intermediate cover as claimed in claim 1, further comprising:

a seal structure provided at lower portions of said side surfaces, wherein said seal structure includes flanges of outwardly folded lower portions of said side surfaces, and under seals mounted onto lower surfaces of said flanges.

3. The intermediate cover as claimed in claim 1, further comprising:

a seal structure provided at lower portions of said side surfaces, wherein said seal structure includes J- or U-shaped sealing members fixed to interiors of lower portions of said side surfaces.

4. The intermediate cover as claimed in claim 1, further comprising:

a seal structure provided at lower portions of said side surfaces, wherein said seal structure includes labyrinth seal portions of inwardly folded lower portions of said side surfaces, said labyrinth seal portions being engaged with recessed grooves formed in said guide rail in a non-contact manner.

5. The intermediate cover as claimed in claim 1, further comprising:

narrowed portions respectively disposed at lower portions of said side surfaces.

6. The intermediate cover as claimed in claim 1, further comprising:

labyrinth seal portions of inwardly folded lower portions of said side surfaces, said labyrinth seal portions being engaged with recessed grooves formed in said guide rail on a non-contact manner.

7. The intermediate cover as claimed in claim 1, further comprising:

J- or U-shaped sealing members fixed to interiors of lower portions of said side surfaces.

8. The intermediate cover as claimed in claim 1, further comprising:

a seal structure provided at lower portions of said side surfaces, wherein said seal structure includes narrowed portions respectively disposed at lower portions of said side surfaces.

9. The intermediate cover as claimed in claim 1, further comprising:

flanges of outwardly folded lower portions of said side surfaces, and under seals mounted onto lower surfaces of said flanges.

10. The intermediate cover as claimed in claim 1, further comprising:

a seal structure provided at lower portions of said side surfaces, wherein said seal structure includes non-contact seal members.

11. The intermediate cover as claimed in claim 1, further comprising:

central body portion securing portions disposed from end portions of said side surfaces over said side surfaces for securing said second sub-portion, wherein said body portion comprises a first sub-portion, a second sub-portion, and a third sub-portion, said second sub-portion being overlapped on said first and third sub-portions.

12. The intermediate cover as claimed in claim 1, wherein said body portion comprises a first sub-portion and a second sub-portion, said first and second-sub-portions being overlapped on each other through connecting portions, an axially extending elongated hole being formed in said connecting portion of one of said first and second sub-portions.

13. An intermediate cover for covering an exposed surface of a guide rail of a linear guide device existing between a first slider and a second slider respectively fitted with said guide rail in such a manner that said first and second sliders are movable with respect to said guide rail through rolling movements of a large number of rolling elements within loaded roller rolling grooves respectively formed in said guide rail and extending in an axial direction of said guide rail, said intermediate cover comprising:

a body portion of a U-shaped section including an upper surface and two side surfaces respectively located adjacent to said exposed surface of said guide rail;

two mounting portions disposed at two ends of said body portion respectively for mounting said intermediate cover onto said first and second sliders, wherein said mounting portions are projected end portions of said upper surface of said body portion folded upwardly at right angles; and hooks of folded end portions of said mounting portions.

14. An intermediate cover for covering an exposed surface of a guide rail of a linear guide device existing between a first slider and a second slider respectively fitted with said guide rail in such a manner that said first and second sliders are movable with respect to said guide rail through rolling movements of a large number of rolling elements within loaded roller rolling grooves respectively formed in said guide rail and extending in an axial direction of said guide rail, said intermediate cover comprising:

a body portion of a U-shaped section including an upper surface and two side surfaces respectively located adjacent to said exposed surface of said guide rail;

two mounting portions disposed at two ends of said body portion respectively for mounting said intermediate cover onto said first and second sliders; and plate-shaped sealing members fixed to interiors of lower portions of said side surfaces.

15. An intermediate cover for covering an exposed surface of a guide rail of a linear guide device existing between a first slider and a second slider respectively fitted with said guide rail in such a manner that said first and second sliders are movable with respect to said guide rail through rolling movements of a large number of rolling elements within loaded roller rolling grooves respectively formed in said guide rail and extending in an axial direction of said guide rail, said intermediate cover comprising:

a body portion of a U-shaped section including an upper surface and two side surfaces respectively located adjacent to said exposed surface of said guide rail;

two mounting portions disposed at two ends of said body portion respectively for mounting said intermediate cover onto said first and second sliders; and a seal structure provided at lower portions of said side surfaces, wherein said seal structure includes plate-shaped sealing members fixed to interiors of lower portions of said side surfaces.

16. An intermediate cover for covering an exposed surface of a guide rail of a linear guide device existing between a first slider and a second slider respectively fitted with said guide rail in such a manner that said first and second sliders are movable with respect to said guide rail through rolling movements of a large number of rolling elements within loaded roller rolling grooves respectively formed in said guide rail and extending in an axial direction of said guide rail, said intermediate cover comprising:

a body portion of a U-shaped section including an upper surface and two side surfaces respectively located adjacent to said exposed surface of said guide rail;

two mounting portions disposed at two ends of said body portion respectively for mounting said intermediate cover onto said first and second sliders; and a seal structure provided at lower portions of said side surfaces, wherein said seal structure includes contact seal members.

* * * * *